United States Patent
Lenoble et al.

(10) Patent No.: US 11,518,905 B2
(45) Date of Patent: Dec. 6, 2022

(54) AQUEOUS LEATHER COATING COMPOSITION

(71) Applicants: Dow Silicones Corporation, Midland, MI (US); Dow Global Technologies LLC, Midland, MI (US); Rohm and Haas Company, Collegeville, PA (US)

(72) Inventors: Bertrand Lenoble, Seneffe (BE); Nancy Delys, Seneffe (BE); Stephane Ugazio, Seneffe (BE); Edwin Nungesser, Collegeville, PA (US); Xiangyi Zhang, Collegeville, PA (US); David Malotky, Midland, MI (US)

(73) Assignees: Dow Silicones Corporation, Midland, MI (US); Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 0 days.

(21) Appl. No.: 17/639,378

(22) PCT Filed: Oct. 22, 2020

(86) PCT No.: PCT/US2020/056754
§ 371 (c)(1),
(2) Date: Mar. 1, 2022

(87) PCT Pub. No.: WO2021/101651
PCT Pub. Date: May 27, 2021

(65) Prior Publication Data
US 2022/0325134 A1 Oct. 13, 2022

Related U.S. Application Data

(60) Provisional application No. 62/937,280, filed on Nov. 19, 2019.

(51) Int. Cl.
*C09D 175/04* (2006.01)
*C09D 7/65* (2018.01)
*C14C 11/00* (2006.01)

(52) U.S. Cl.
CPC ............ *C09D 175/04* (2013.01); *C09D 7/65* (2018.01); *C14C 11/006* (2013.01)

(58) Field of Classification Search
CPC ........ C09D 175/04; C09D 7/65; C14C 11/006
USPC ....................................................... 524/501
See application file for complete search history.

(56) References Cited

U.S. PATENT DOCUMENTS

| | | |
|---|---|---|
| 3,930,921 A | 1/1976 | Connett |
| 5,356,706 A | 10/1994 | Shores |
| 5,539,021 A | 7/1996 | Pate et al. |
| 5,688,842 A | 11/1997 | Pate, III et al. |
| 5,874,069 A | 2/1999 | Mendolia et al. |
| 5,919,441 A | 7/1999 | Mendolia et al. |
| 5,981,680 A | 11/1999 | Petroff et al. |
| 6,051,216 A | 4/2000 | Barr et al. |
| 6,074,747 A | 6/2000 | Scholz et al. |
| 6,353,051 B1 | 3/2002 | Huang |
| 6,353,076 B1 | 3/2002 | Barr et al. |
| 6,426,062 B1 | 7/2002 | Chopra et al. |
| 6,451,295 B1 | 9/2002 | Cai et al. |
| 6,783,766 B2 | 8/2004 | Pate et al. |
| 6,794,445 B2 | 9/2004 | Ruesmann et al. |
| 6,800,713 B2 | 10/2004 | Cook et al. |
| 7,232,859 B2 | 6/2007 | Argyropoulos et al. |
| 7,329,699 B2 | 2/2008 | Liew et al. |
| 7,790,827 B2 | 9/2010 | Nguyen et al. |
| 7,896,929 B2 | 3/2011 | Nguyen et al. |
| 8,591,999 B2 | 11/2013 | Lenoble et al. |
| 8,742,053 B2 | 6/2014 | Lange et al. |
| 9,200,404 B2 | 12/2015 | Grzesiak et al. |
| 9,662,283 B2 | 5/2017 | Lemoine et al. |
| 9,863,012 B2 | 1/2018 | Watanabe |
| 10,100,377 B2 | 10/2018 | Eryazici et al. |
| 2003/0082129 A1 | 5/2003 | Buckingham et al. |
| 2003/0235553 A1 | 12/2003 | Lu et al. |
| 2004/0167252 A1 | 8/2004 | Melchiors et al. |
| 2004/0180032 A1 | 9/2004 | Manelski et al. |
| 2005/0222368 A1 | 10/2005 | Reiners et al. |
| 2008/0318057 A1* | 12/2008 | Sherman ............... C09J 183/10 525/477 |
| 2010/0310882 A1 | 12/2010 | Ogawa et al. |
| 2011/0076409 A1* | 3/2011 | Lenoble ................ C14C 11/003 252/8.57 |
| 2011/0112245 A1 | 5/2011 | Nakamura et al. |
| 2012/0052030 A1 | 3/2012 | Mac Dermott et al. |
| 2012/0052939 A1 | 3/2012 | Lutnick et al. |
| 2016/0177408 A1* | 6/2016 | Watanabe ............... C09D 7/42 252/8.57 |

FOREIGN PATENT DOCUMENTS

| | | |
|---|---|---|
| WO | 2009002611 | 12/2008 |
| WO | 2014123775 | 8/2014 |
| WO | 2018115328 | 6/2018 |

OTHER PUBLICATIONS

Dow Corning, Textile & Leather Solutions, Silicones for Leather Treatment brochure.
P. Dieterich, Aqueous Emulsion, Dispersion and Solutions of Polyurethanes; Synthesis and Properties, Progress in Organic Coatings 9 (1981) 281-340.
Search Report of corresponding Chinese Application No. 202080077329.1 dated Jul. 27, 2022.
Office Action of corresponding Chinese Application No. 202080077329.1 dated Sep. 6, 2022.

* cited by examiner

*Primary Examiner* — Kelechi C Egwim
(74) *Attorney, Agent, or Firm* — Edward W. Black

(57) ABSTRACT

An aqueous coating composition comprising an aqueous dispersion of polyurethane and a siloxane-based polyamide.

6 Claims, No Drawings

AQUEOUS LEATHER COATING COMPOSITION

CROSS REFERENCE TO RELATED APPLICATIONS

This application claims the benefit of U.S. Provisional Patent Application Ser. No. 62/937,280 filed on 19 Nov. 2019 under 35 U.S.C. § 119 (e). U.S. Provisional Patent Application Ser. No. 62/937,280 is hereby incorporated by reference.

FIELD

The invention is directed toward aqueous coating compositions suitable for treating leather and leather-like substrates and in particular, compositions including aqueous dispersions of polyurethane and silicone additives along with methods of preparing and using the same.

INTRODUCTION

Leather is often finished with one or more coatings in order to improve its overall performance, e.g. wear resistance, flexibility, etc. Such coatings are most commonly dispersions of polyurethane. Representative examples are described in: U.S. Pat. Nos. 3,930,921, 6,353,051, 6,794,445, 8,591,999, U.S. Pat. No. 9,200,404, U.S. Ser. No. 10/100,377, US2005/0222368 and US2010/0310882. Silicones are often included in the coating composition to improve one or more of haptic properties ("hand"), appearance, water repellency, abrasion resistance and breathability. Representative silicone additives are commercially available as formulated blends, dispersions, suspensions, emulsions and fluids. Commercial examples include DOWSIL™ FBL-3289 and DOWSIL™ 5-7299 Dispersion (both high molecular weight silicone system dispersed in water) and XIAMETER™ OFX-0531 fluid (aminomethoxy-functional polydimethyl siloxane), all available from The Dow Chemical Company.

There continues to be a need for improved aqueous leather coating compositions that offer improved performance attributes including one or more of the following: compatibility (i.e. defect-free coating), gloss, anti-soiling, low stick-slip (e.g. blocking and squeak) and abrasion resistance.

SUMMARY

The invention includes multiple embodiments including: i) an aqueous coating composition including an aqueous dispersion of polyurethane and a siloxane-based polyamide, ii) a method of making said aqueous coating composition and iii) a method of coating a substrate, e.g. leather, therewith.

In one aspect of the invention, the siloxane-based polyamide comprises a block copolymer comprising siloxane and amide blocks. In another aspect of the invention, the siloxane-based polyamide has at least one or more and preferably all of the following physical properties:
i) weight average molecular weight (Mw) of: 50,000 to 200,000 Daltons;
ii) melting point range of 70 to 120° C.;
iii) melt viscosity of 5000 to 10,000 cps at 140° C.; and
iv) particle size of 0.1 to 15 micron.

In another aspect of the invention, the siloxane amide block copolymer is represented by Formula A:

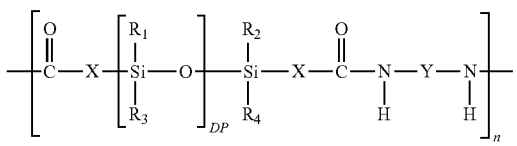

wherein:
(1) DP is 1-700; (2) n is a 1-500; (3) X is a divalent, aliphatic hydrocarbon group having 1-30 carbons;
(4) Y is:
  (a) a divalent hydrocarbon group having 1-40 carbons, wherein the hydrocarbon group may optionally and additionally be substituted by at least one member selected from the group consisting of (i) hydroxy; (ii) a C3-C8 cycloalkyl; (iii) 1-3 members selected independently from the group consisting of C1-C3 alkyls and phenyl optionally substituted by 1-3 members selected independently from the group consisting of C1-C3 alkyls; (iv) a C1-C3 hydroxy alkyl; and (v) a C1-C6 alkyl amino, and the hydrocarbon group may optionally and additionally contain at least one of (i) 1-3 amide linkages; (ii) a C5 or C6 cyclic, divalent, saturated hydrocarbon group; and (iii) a phenylene optionally substituted by 1-3 members selected independently from the group consisting of C1-C3 alkyls, or
  (b) $-R^{20}T(R^{21})R^{22}-$, where $R^{20}$ and $R^{22}$ are divalent C1-C10 hydrocarbon groups and $R^{21}$ is a monovalent or divalent C1-C10 hydrocarbon group, such groups being independent of one another, and T is C(R), where is selected from hydrogen, R1, R2, R3, R4, or a trivalent N, P or Al; and
(5) Each of R1, R2, R3 and R4 is independently selected from the group consisting of methyl, ethyl, propyl, isopropyl, a siloxane chain, and phenyl, wherein the phenyl may optionally be substituted at 1-3 positions by substituents independently selected from the group consisting of methyl and ethyl. In another aspect of the invention, the aqueous coating composition comprises from 20 to 60 wt % of said polyurethane and 0.5 to 10 wt % of said siloxane-based polyamide. In yet another aspect of the invention, the aqueous coating composition, the polyurethane has a Mw 150,000 to 1,500,000 Daltons.

DETAILED DESCRIPTION

The aqueous coating composition of the present invention includes an aqueous dispersion of polyurethane. The polyurethanes of the present invention can be any polyurethane having the requisite glass transition temperature (Tg) made by conventional methods from one or more diisocyanate, e.g. isophorone diisocyanate or tetramethylene diisocyanate, or a polyisocyanate, and one or more polyol. Suitable polyols for making the polyurethane of the present invention can be any having the requisite Tg (DSC), such as a polyether polyol, polycarbonate polyol, or polyester polyol having a molecular weight (Mw) of 5,000 or less, or of 2,000 or less. Such polyols are preferably linear and have two hydroxyl groups, one at each end. It is preferable that the polyurethane comprise a polycarbonate polyol. Representative examples of applicable commercial polyurethane dispersion products include: BAYDERM™ and AQUDERM™ from Lanxess Corp., PERMUTEX™ from Stahl Polymer, HAUTHANE™ L-3121 from C. L. Hauthaway & Sons Corp. and PRIMAL™ BINDER available from The Dow Chemical Company. Applicable polyurethane dispersions can be prepared by methods conventional in the art. See for example the methods described in P. Pieterich, Aqueous Emulsion, Dispersion and Solutions of Polyurethanes; Synthesis and Properties in Progress in Organic Coatings 9 (1981) 281-340. See also: U.S. Pat. No. 7,232,859, US2004/0167252 and US2011/0112245. Such polyurethanes are commonly prepared by reacting an organic polyisocyanate(s) with an organic compound(s) containing isocyanate-reactive groups, particularly a polyol. The reaction may be carried out in the presence of a catalyst such as organic tin compounds and/or tertiary amines. The polyurethanes are made into aqueous dispersion by conventional means and may be anionic salt functional, non-ionic or anionic polyurethane dispersions. In one embodiment, the polyurethane dispersion may be an anionic polyurethane dispersion prepared by reacting one or more polyol with an organic compound having at least one acid group and at least two active hydrogen functionalities and a polyisocyanate. Suitable organic compounds having at least one acid group and at least two active hydrogen functionalities include, for example, 2,2-dimethylolacetic acid and 2,2-dimethylolpropionic acid. Examples of acid groups suitable for the organic compound include, carboxylic acid, sulfonic acid, phosphoric, phosphonic acid and the like.

In one set of embodiments, the polyurethanes are selected from those having a weight average particle size (BI-90) of from 20 to 500 nm, preferably from 30 to 200 nm. As used herein, the phrase "weight average particle size," refers to the weight average particle size of a distribution of particles as determined by electrical impedance using a BI-90 Multisizer™ 3 Coulter Counter (Beckman Coulter, Inc., Fullerton, Calif.), per manufacturer's recommended procedures as of December 2019.

In another set of embodiments, the polyurethanes are selected from those having a weight average molecular weight (Mw) of 100,000 to 3,000,000 Daltons (AMU), or more preferably from 150,000 to 1,500,000 Daltons.

In addition to the aqueous dispersion of polyurethane, the subject aqueous coating composition includes a siloxane-based polyamide. As will be described below, the siloxane-based polyamide may be prepared as an aqueous emulsion and combined with the aforementioned aqueous dispersion of polyurethane. Unlike polyorganosiloxanes conventionally used in leather coating applications, the subject siloxane-based polyamides are thermoplastics. This attribute is believed to improve dry film formation resulting in a more durable coating.

The subject siloxane-based polyamides are preferably block copolymers including siloxane and amide blocks. Applicable block copolymers along with methods for their preparation are described in U.S. Pat. No. 6,800,713 (i.e. hydrosilylation reaction of vinyl end blocked biamide with a —SiH terminated polyorganosiloxane) which is incorporated herein in its entirety. Commercial examples of such copolymers include DOWSIL 2-8179 and 2-8178 (e.g. nylon-611/dimethicone copolymer) historically sold by Dow Corning and which are described in connection with gellants for personal care products. See for example: U.S. Pat. Nos. 5,874,069, 5,919,441, 5,981,680, 6,051,216, 6,353,076, 7,329,699, US2003/0082129, US2004/0180032, US2012/0052030, and WO2014/123775. Additional applications of such materials include use as thermoplastics additives and as part of fabric treatments. See for example: U.S. Pat. Nos. 7,790,827 and 7,896,929.

In a series of embodiments the subject siloxane-based polyamides have one or more (and preferably all) of the following physical properties:

i) weight average molecular weight (Mw) of: 50,000 to 200,000 Daltons (AMU), and more preferably from 70,000 to 90,000 Daltons (AMU);

ii) melting point range of 70 to 120° C. and more preferably of 70 to 105° C. as determined by ASTM D87-09 (2018);

iii) melt viscosity of 5000 to 10,000 cps at 140° C. and more preferably from 6000 to 9000 cps at 140° C. as determined by ASTM D4283-98(2015); and a iv) particle size of 0.1 to 15 micron and more preferably 0.2 to 10 micron as determined by laser diffraction using a Malvern 3000 and in accordance ISO 13320 (2009).

In another series of embodiments the subject siloxane-based polyamides can be represented by Formula A as presented above, wherein:
(1) DP is 1-700, preferably from 50-200, more preferably 75-150 and still more preferably from 100-120); (2) n is a 1-500, preferably 2-50, more preferably 5-20 and still more preferably 7-12; (3) X is a divalent, aliphatic hydrocarbon group having 1-30 carbons; (4) Y is:

(a) a divalent hydrocarbon group having 1-40 carbons, wherein the hydrocarbon group may optionally and additionally be substituted by at least one member selected from the group consisting of (i) hydroxy; (ii) a C3-C8 cycloalkyl; (iii) 1-3 members selected independently from the group consisting of C1-C3 alkyls and phenyl optionally substituted by 1-3 members selected independently from the group consisting of C1-C3 alkyls; (iv) a C1-C3 hydroxy alkyl; and (v) a C1-C6 alkyl amino, and the hydrocarbon group may optionally and additionally contain at least one of (i) 1-3 amide linkages; (ii) a C5 or C6 cyclic, divalent, saturated hydrocarbon group; and (iii) a phenylene optionally substituted by 1-3 members selected independently from the group consisting of C1-C3 alkyls, or (b) $R^{20}T(R^{21})R^{22}$, where $R^{20}$ and $R^{22}$ are divalent C1-C10 hydrocarbon groups and $R^{21}$ is a monovalent or divalent C1-C10 hydrocarbon group, such groups being independent of one another, and T is C(R), where is selected from hydrogen, $R^1$, $R^2$, $R^3$, $R^4$, or a trivalent N, P or Al; the divalencies and trivalencies here should be understood and taken to all for branching, etc., and (5) Each of R', $R^2$, $R^3$ and $R^4$ is independently selected from the group consisting of methyl, ethyl, propyl, isopropyl, a siloxane chain, and phenyl, wherein the phenyl may optionally be substituted at 1-3 positions by substituents independently selected from the group consisting of methyl and ethyl, and in one preferred embodiment, $R_1$, $R_2$, $R_3$ and $R_4$ are all methyl.

In a series of preferred embodiment, X and Y are independently selected from a C4-C18 aliphatic hydrocarbon group (e.g. an alkylene group).

As mentioned, the subject siloxane-based polyamides may be prepared via a hydrosilation reaction of a vinyl end blocked biamide with a —SiH terminated polyorganosiloxane. Polymerization can be carried out batch-wise or continuously. Suitable examples of amides for incorporation into polyamides by the methods of the present invention include those that can be formed from omega-olefinic carboxylic acids and linear alkyl diamines. Examples of olefinic acids useful for such purpose include acrylic acid, 3-butenoic acid, 4-pentenoic acid and 10-undecylenic acid. Useful diamines include ethylene diamine, hexamethylene diamine, decamethylene diamine, and although not an alkyl diamine, phenylene diamine. Examples of siloxanes for incorporation into polyamides by the methods of the present invention include dimethylhydrogen end blocked polydimethyl siloxanes.

In one particular embodiment the subject siloxane-based polyamide is prepared according to the following:

(1) optionally purifying an omega-olefinic carboxylic acid by distillation or other suitable method to remove impurities that may include colored species;

(2) reacting an omega-olefinic carboxylic acid or the product of (1) with a diamine so as to form a vinyl terminated diamide;

(3) processing the product of (2) to remove, to a set level or below some set level (as determined by experience or a system model as discussed below), species that act as chain terminators in the copolymerization of siloxanes and diamides by using a suitable method such as vacuum distillation;

(4) optionally storing the product of (3) in an inert atmosphere (such as under nitrogen), at least until the material has cooled to less than 30 degrees C., which is believed to help to prevent oxidation and/or colorization prior to copolymerization; and (5) copolymerizing the product of (3) or optionally of (4) with an SiH containing siloxane.

Of course, it is possible to start with a purchased version of the organic product of any of steps (1), (2), (3) or (4) or some equivalent and short cut this method. Other possible alternatives include removal of chain terminators at other than step (3), introduction of chain terminators anywhere in the overall process, performing either of these operations at multiple points, or some combination of these.

In the siloxane-diamide system generally, polymerization chain terminators include, but are not limited to, residual carboxylic acid (from step (2) above and/or a purchased equivalent) and monoamide. (Monoamide is defined for this purpose as a material in which only one of the amine groups present in the diamine species has reacted with an omega olefinic acid and resulting in a monovinyl functional monoamine/monoamide). These chain terminators are typically found as impurities in the reaction product of step (2) above or equivalents.

It has been found that if undecanoic and/or palmitic acid are added during the synthesis of the diamide, a chain terminator is formed from the diamine and either or both of these acids, since these acids act as "endcappers". That is, an end capped diamide (vinyl only on one end) is produced that will act as a chain terminator in siloxane-based polyamide synthesis generally; diamide produced with no vinyl is neither a terminator nor a chain extender and production of it should (usually) be limited by using excess unsaturated acid or other means. Any saturated fatty acid may be used as an endcapper, preferably C10-C16 acids.

The total chain terminator level is probably more significant than that of any individual terminator. Overall, it is usually preferred that total chain terminators in the siloxane-polyamide system (most often residual omega-olefinic carboxylic acid and monoamide) range from 1.0-3.0, especially 1.5-2.5 and most especially 1.8-2.2 mole percent of the diamide (or based on the diamide) on average as used in the polymerization. These ranges are alternatively expressed in terms of molar ratios of the total chain terminators to total pure diamide in the diamide material used in the polymerization: 1:99 to 3:97, 1.5:98.5 to 2.5:97.5 and 1.8:98.2 to 2.2:97.8.

In batch systems, the ranges and ratios of the preceding paragraph, relating chain terminators to diamide (as well as the ratios to follow relating SiH to vinyl) should be understood as based on totals of materials added to the system up to the end of copolymerization (loosely referred to perhaps as "during" the copolymerization). For continuous systems, the situation should be understood as based on total added to the reaction zone during the retention time in this zone. In either case, it is preferable that materials be added in a consistent proportion (especially stoichiometric) and in continuous systems that reactants (and anything else to be added) be added at the front end of the reaction zone and/or the reaction be run at or near a steady state.

An acceptable range for carboxylic acid content for the copolymerization mixture in siloxane-based polyamide synthesis by methods such as the present embodiment is expressed in terms of the "acid number" (gram equivalents of KOH per kilogram of diamide) is 0.03-2.2, with a preferred range being 0.50-1.00 and a more preferred range being 0.60-0.80. The levels of monoamide may be determined by Electron Spray Ionization Mass Spectrometry as were those reported herein with an acceptable range being 0.9 to 1.1 mole percent based on the diamide.

Although not a classic chain terminator, residual diamine may poison or partially inactivate catalysts routinely used, as can even residual monoamide-monoamine (which is a chain terminator). An acceptable range expressed in terms of the "base number" (gram equivalents of HCl per kilogram of diamide added to the polymerization mixture) is 0.0 to 0.2, with a preferred range being 0.0-0.1 and a more preferred range being 0.0-0.05. Higher values may be tolerable in any case. "Base number" values will necessarily include some of the monoamide present, but not all monoamide is detected this way.

In the formation of the diamide, it is usually preferred to use at least a slight excess of acid as diamines tend to have quite unpleasant smells and are catalysts poisons as previously stated and can carry over into the product polymer.

For siloxane-based polyamide synthesis, such as illustrated in the present embodiment, it is preferred that a linear siloxane with an —SiH group on each end be used as a reactant, although alternatives are often acceptable. Presence of siloxane —SiH at least somewhere in the reactants is contemplated (as this polymerization is basically a hydrosilylation). It is of note that a siloxane with an SiH group on only one end (at least before addition of any diamide) is itself partially chain terminated, and it could act as a chain terminator by binding to a vinyl end of a growing polyamide chain.

It is preferred that the diamide be linear with a terminal vinyl group (carbon-carbon double bond) on each end, although alternatives are sometimes acceptable. Presence of diamide vinyl somewhere in the reactants is contemplated (as this polymerization is basically a hydrosilylation). It is of note that a diamide with a single, vinyl group (at least when terminal) will act as a chain terminator. Polymerizations with catalysts described herein where non-terminal vinyl diamide is used and polymerization without catalyst regardless of vinyl location have been ordinarily noted to proceed extremely slowly if at all.

It has been found in siloxane-based polyamide synthesis generally that as the molar ratio of the silicone SiH and diamide vinyl approaches 1:1 from either direction, at a set level of chain terminators, the molecular weight of the resulting copolymer increases. It is preferred that this ratio be 0.9:1.1, especially 0.95:1.05 and most especially 0.99 to 1.01.

For many applications and/or corresponding compounding processes, siloxane polyamides of a weight average molecular weight range of about: 50,000 to 200,000 Daltons (AMU) and more preferably: 70,000 to 90,000 (with subunit siloxane number average DP of 12-18) are usually preferable, in that those below this range are too brittle, while those above are too viscous for common processing methods to be effective. Manipulation of levels of chain terminators and ratio of copolymerization reactants makes rather precise control of molecular weight of the final copolymer possible.

It is usually preferred that a catalyst be used in silicone diamide copolymerization. For siloxane diamide copolymerization, any of the catalysts known in the art to be suitable for such reaction can be employed, such as those based on a Group VIII transition metal, a noble metal. The platinum-based catalysts falling in this class are preferred. Most preferred are platinum-silicone based catalysts of this same class. Such noble metal catalysts are described in U.S. Pat. No. 3,923,705 incorporated herein by reference to show such catalysts. One preferred platinum catalyst is Karstedt's catalyst that is described in U.S. Pat. Nos. 3,715,334 and 3,814,730, which are incorporated herein by reference as to this catalyst. Karstedt's catalyst is a platinum divinyl tetramethyl disiloxane complex typically containing about one weight percent platinum in a solvent such as toluene. Another preferred platinum catalyst is a reaction product of chloroplatinic acid and an organosilicon compound containing terminal aliphatic unsaturation as described in U.S. Pat. No. 3,419,593, incorporated herein by reference as to this catalyst. Most preferred as the catalyst is a neutralized complex of platinous chloride and divinyl tetramethyl disiloxane, for example, as described in U.S. Pat. No. 5,175,325, and incorporated by reference as to this description.

Temperature of the copolymerization is not critical, but it is preferred that it be high enough so that the reactants are melted, will dissolve or are miscible (at least in most siloxane polyamide systems) but not so high that appreciable isomerization of the omega double bond in the acid incorporated into the diamide occurs.

While not preferred, solvents may be used during the polymerization. If used, toluene and xylene have been found to be suitable and virtually interchangeable solvents but must be removed (such as by stripping) when the polymers are to be used in many applications because of odor, health and/or environmental regulations or concerns. Decamethylcyclopentasiloxane and phenyl tris (trimethylsiloxy) silane are possible alternatives in such cases. Similarly, polypropylene glycol ethers of linear alcohols (such as those of myristyl alcohol) may also be used. Examples of these ethers include PPG-3 myristyl ether and PPG-4 myristyl ether. As mentioned, the preparation of the siloxane-based polyamide is preferably from a solventless system wherein "solventless" means the absence of solvent other than any residual solvent such as that added as part of a catalyst or reactant formulation. In any case, reaction systems containing less than 1.0 wt % solvent, and preferably less than 0.1 wt % or even 0.0 wt % regardless of source, will be taken as "solventless" or considered to be "substantially no solvent".

The subject siloxane-based polyamide may be provided as part of an aqueous emulsion and in particular, as a high internal phase ratio (HIPR) polymer-in-water emulsion. Such HIPR emulsions may be prepared by a variety of methods including batch and continuous methods as are well known in the art. In particular, preferred methods include those described in U.S. Pat. Nos. 5,539,021, 5,688,842 and 6,783,766 which are incorporated herein by reference. For example, as described in U.S. Pat. No. 5,539,021 at column 3, line 15 to column 6, line 27, (which passage is incorporated herein by reference), a stream containing the continuous aqueous phase is flowed through a first conduit and merged continuously with a stream of the polymer phase (siloxane-based polyamide) that is flowed through a second conduit. The streams are merged into a disperser in the presence of a stabilizing amount of surfactant. The surfactant can be added to either stream, or as a separate stream, but is preferably added to the stream containing the polymer (siloxane-based polyamide) phase. The rates of the streams are adjusted within the HIPR emulsion region (e.g. 74% to about 99%) so that particle size and polydispersity of the emulsion are optimized for the particular application. Preferably, the rates of the streams are adjusted so as to produce an HIPR emulsion having a polymer phase-to-aqueous phase ratio of from about 80% to about 95% by volume. Generally, the volume-average mean particle size ("Vmean") of the polymer is preferably not less than 0.1 µm, more preferably not less than 0.3 µm, and most preferably not less than 0.4 µm; and preferably not greater than 20 µm, and more preferably not greater than 10 µm, (e.g. from 0.1 to 20 µm, more preferably 0.3 to 10 µm and still more preferably 0.4 to 5 µm).

If the preferred continuous method for preparing the HIPR emulsion is used, the polymer phase must be flowable through the conduit. If the polymer (siloxane-based polyamide) is too high in viscosity so as to not be flowable at ambient temperatures, the polymer may be rendered flowable by heating, preferably to a temperature above the melting point of the polymer.

The emulsion may be stabilized by a stabilizing amount of a surfactant. The concentration of the surfactant is preferably not less than 1% by weight, more preferably not less than 3% by weight, and preferably not more than 20% by weight, more preferably not more than 10% by weight, based on the weight of the polymer phase. External surfactants include nonionic, anionic, or cationic, or combinations of nonionic and anionic or nonionic and cationic.

Minor amounts, preferably not greater than 5%, more preferably not greater than 1%, and most preferably not greater than 0.5% by weight, of water-compatible substances, that is, substances which, by themselves are incapable of forming aqueous emulsions, can be added to the polymer phase prior to emulsification. Examples of such water-compatible substances include rheology modifiers such as carbomers, acrylic copolymers, polyacrylamides, polysaccharides, natural gums, and clays; preservatives such as alkyl esters of p-hydroxybenzoic acid; humectants such as glycerol; and pH modifiers.

The aqueous compositions of the present invention may further include one or more optional additives such as: crosslinking agents, dullers, wetting agents, thickeners or rheology modifiers or their mixtures, curing agents, pigments or colorants, opacifiers and extenders, antioxidants and plasticizers. For example, the aqueous compositions may comprise from 0.5 to 20 wt. %, of one or more aqueous crosslinker, such as, for example, a polyisocyanate, polyaziridine, or aminoplast resin. Such crosslinking agents may be used in amounts of 0.1 wt. % or more, and up to 20 wt. %, for example, from 1 to 10 wt. %. Preferably, the crosslinker is water dispersible, and is an aliphatic polymeric isocyanate. By way of additional example, dullers are commonly included to reduce gloss via light scattering and surface roughening and may comprise known inorganic dullers, such as, for example, silica, fumed silica, alumina, silicates, (sub)carbonates, e.g. calcium carbonate, kaolin, phyllosilicates, talc, titania, zinc oxides, zirconium oxides, and alkali(ne) hydroxides having average diameters from submicron up to 30 µm; or may comprise organic dullers, such as, for example, 2-30 µm average diameter polytetrafluoroethylene, polyethylene, silicone, polyacrylic, polyurethane, urea-formaldehyde or polyvinylidene fluoride beads. The organic dullers may also fortify film strength.

Useful proportions may include up to 100 wt. %, on a solids basis, of the total amount of duller component A) plus additional dullers. Examples of applicable commercial dullers include: fumed and precipitated silica, polymeric beads, (e.g. DOWSIL™ 23n additive), acrylics, (OPTIMATT™ AB Duller from the Dow Chemical Co.) and polyurethane (e.g. ADIMATT™ and SPHAERWET™ from Supercolori S.p.A.). By way of further example, wetting agents may comprise any surface active compound that improves flow or wetting of surfaces, such as, for example, fluorine or silicone containing surfactants, and anionic or nonionic surfactants. Suitable amounts of wetting agent solids may range up to 15 wt. %, preferably, up to 10 wt. %, based on the total solids weight of the aqueous composition. Examples of applicable commercial wetting agents include TRITON™ HW-1000, SURFYNOL™ 104, CAPSTONE™ FS-610, DOWSIL™ 67 Additive and DOWSIL™ 57 Additive. The subject aqueous coating compositions may also optionally include acrylic polymers such as those described in U.S. Pat. No. 9,200,404 and U.S. Ser. No. 10/100,377.

To form the aqueous coating compositions of the present invention, the materials may simply be mixed together using a laboratory stirrer and added dropwise under gentle agitation. In one set of embodiments, the aqueous coating composition comprises from 15 to 99 wt %, more preferably from 20 to 60 wt % and still more preferably from 30 to 40 wt % of polyurethane; and from 0.5 to 10 wt % and more preferably from 1 to 5 wt % of the aforementioned siloxane-based polyamide. The remainder of the coating composition comprises water along with other optional constituents such as surfactants, biocides, etc. For example, the composition may comprise from 40 to 80 wt. % of water, based on the total weight of the composition. In addition, water for dilution may be added, such as, for example, for use at remote site to reduce the total solids of the compositions to a desired range. Accordingly, aqueous compositions may be shipped in any stable concentrated form, such as, for example, aqueous compositions comprising additional materials, e.g. surfactants, wetting agents, etc.

In some embodiments, the aqueous coating composition comprises substantially no solvent (e.g. isopropyl alcohol, glycol ethers, etc.). e.g. less than 10 wt %, less than 1.0 wt %, less than 0.1 wt % or even 0.0 wt %).

In another aspect of the present invention, the methods of using the aqueous compositions comprise forming the aqueous composition, applying the coating composition to one or more substrate, drying, and preferably curing (e.g. at elevated temperature) the coating composition. Drying may be performed in a known manner such as, for example, air drying or heat drying at temperatures that will not damage the substrate. The aqueous compositions may be applied to unfinished or basecoat finished leather, by any suitable means including conventional coatings application methods such as curtain coating, brush coating, roll coating, and spraying methods such as air-atomized spray, air-assisted spray, airless spray, high volume low pressure spray, and air-assisted airless spray. Typical application rates of the aqueous leather treatment composition are in the range of 2.0 to 100 grams dry weight per square meter (g/m2). The coating composition applied to a substrate is generally dried, or allowed to dry, at a temperature range of 20 to 100° C. and more preferably from 85 to 100° C. to provide a coated leather substrate having a dried coating of the aqueous leather coating composition on at least one surface of the leather substrate. The drying and curing method can vary depending on, for example, the specific components of the coating composition, the coating amount, and the type of leather. Examples of the drying and curing method include air drying at room temperature, hot air drying at for example 85° C., and infrared heating.

The aqueous coating composition can be applied directly onto a leather substrate or indirectly coated over a primer layer. Coatings made from the aqueous compositions of the present invention may include basecoats, color coats and topcoats comprising any of clear-coats, stains or translucent coatings, pigmented color coats.

The aqueous leather coating composition can be applied to leather or a leather-like substrate such as, for example, natural leather, artificial leather, synthetic leather and vinyl leather. Examples of leather-like substrates include polyurethanes, polyvinyl chlorides; polyolefins, and polyamides. Likewise, the coating composition can be applied to natural skin that originated from, for example a cow, a sheep, a goat, a pig, a horse, a kangaroo, a deer, an alligator, or a snake. The coating composition can be applied to leather such as mineral-tanned or vegetable-tanned leather including full-grain leather, buffed or corrected-grain leather, and split leather, with or without a prior treatment with an impregnating resin mixture and with or without the application of subsequent coatings. The leather can receive a smooth or hair cell embossing prior to coating with the aqueous leather treatment composition to provide a flat surface for coating or to reduce the porosity of buffed or split leather.

As used herein, unless otherwise indicated, the phrase "weight average molecular weight" or "Mw" refers to the weight average molecular weight of a polymer as measured by gel permeation chromatography (GPC).

Many embodiments of the invention have been described and, in some instances, certain embodiments, selections, ranges, constituents, or other features have been characterized as being "preferred." Such designations of "preferred" features should in no way be interpreted as an essential or critical aspect of the invention. Expressed ranges specifically include designated end points.

EXAMPLES

Unless otherwise indicated, all units of temperature are room temperature (RT) and all units of pressure are standard pressure (1 atm or 760 mBar). The following materials were used to prepare sample aqueous coating compositions.

Polyurethane dispersion 1 (PUD1): PERMUTEX™ RU 13-085 from Stahl Polymer.

Polyurethane dispersion 2 (PUD2): PRIMAL™ Binder 91UD from The Dow Chemical Co.

Polyisocyanate crosslinker (XL1): AQUADERM™ XL-80 from Lanxess.

Emulsion A: DOWSIL™ 2-8179 Gellant obtained from The Dow Chemical Co. (siloxane-based polyamide) was emulsified in water using sodium lauryl ether sulfate. In particular, the polymer was delivered to a rotor stator mixer at a rate of 38.6 g/min where the polymer is combined with a surfactant (EMPICOL™ ESB70 sodium laureth sulfate, 70% active from Huntsman) fed by a 500 ml Isco syringe pump at a rate of 3 ml/min and a water feed fed by a 500 ml Isco syringe pump at a rate of 3 ml/min. The rotor stator mixer was operated at 840 rpm and was heated to 115° C. This concentrated emulsion was then combined with an additional water feed fed by a 500 ml Isco syringe pump at 35 ml a minute in a second rotor stator mixer heated to 115° C. spinning at 450 rpm. The diluted emulsion exited the process through a back pressure regulator. These process settings generated a dispersion with the following analytical: pH=6.6, 55.3% solids, Vmean=0.54 um.

Emulsion B: A nylon 11 polymer (PA 11) having a melting point 180° C. from DuPont was emulsified in water using a 36 L/D co-rotating twin screw extruder rotating at 470 rpm. A blend of 60% nylon 11 pellets and 40% PRIMACOR™ 5980 (ethylene acrylic acid copolymer as an emulsifier) pellets was fed into the extruder feed throat by a gravimetric solids feeder at a rate of 75.6 g/min. DI water (38.3 ml/min) and dimethylethanolamine (15.4 ml/min) were fed together into an injector into the extruder. The extruder barrel temperature was set to 205° C. In a later barrel segment, an additional 210 g/min of water was added to take the dispersion down to a flowable % solids where the extruder barrel temperature was also set to 205° C. A back pressure regulator at the extruder outlet is used to ensure the extruder remains hydrolytically full at all times, and to keep the internal pressure of the extruder above the steam temperature of water so the water in the process remains as a liquid. These process conditions generated a dispersion with the following analytical: pH=9.87, 28.8% solids, Vmean=0.49 microns after cooling and filtration through a 200 micron filter.

Emulsion C: DOWSIL™ 2-5088 silicone wax obtained from The Dow Chemical Company was emulsified with EMPICOL™ ESB70 using the methodology generally described with respect to Emulsion A. In particular, DOWSIL™ 2-5088 silicone wax was melted and delivered to a rotor stator mixer at a rate of 16.0 g/min where it was combined with a surfactant feed of EMPICOL ESB70 (sodium laureth sulfate, 70% active, Huntsman) fed by a 500 ml Isco syringe pump at a rate of 1 ml/min and a water feed fed by a 500 ml Isco syringe pump at a rate of 1.1 ml/min. The rotor stator mixer was spinning at 730 rpm and was heated to 115 C. This concentrated emulsion was then combined with an additional water feed fed by a 500 ml Isco syringe pump at 12 ml a minute in a second rotor stator mixer heated to 115° C. spinning at 370 rpm. The diluted dispersion then exited the process through a back pressure regulator. These process settings generated a dispersion with the following analytical: pH=7.68, 54.88% solids, Vmean=0.86 μm.

Emulsion D: DOWSIL™ 5-7299, a high molecular weight polyorganosiloxane emulsion was obtained from The Dow Chemical Company. This is a commercially available silicone emulsion commonly used for leather coating. The active level is 50%. pH=6, 64% solids, Vmean=22.4 μm.

Emulsion E: DOWSIL™ 902H resin (a 50% active nonionic silicone resin emulsion) was obtained from The Dow Chemical Company. This is a commercially available silicone emulsion commonly used to provide water repellency to water-based coatings. pH=8, 55% solids, Vmean=1.42 μm.

Unless otherwise indicated, all sample aqueous coating compositions (Samples A-I) were prepared by combining the indicated constituents (e.g. polyurethane dispersion (PUD1, PUD2), crosslinker (XL1) and Emulsion A-E) using a lab stirrer from IKA equipped with a small upper pitched blade rotating at 500 rpm for 5 minutes. A Control coating including only PUD1 was also tested.

Unless otherwise indicated, Sample coatings are coated upon a natural chrome tanned white colored leather using a using a 60μ cylindrical film applicator from BYK. Two layers of each Sample coating is applied. After each coating application, the coating is allowed to dry for 2 minutes at 80° C.

Test Methods: The following test methods were used to evaluate the Samples.

Compatibility test: This is a visual assessment of the characteristics of a coated Sample. In this test, a Sample coating composition is coated using a 60μ cylindrical film applicator from BYK upon a sheet of a sealed opacity chart (form 2A obtained from Leneta Company). The top of the chart is black and the bottom is white with an overall dimensions of 5½×10 in (140×254 mm). The coated chart was then dried in a conventional oven for 2 minutes at 80° C. The continuous film generated by the coating formulation is visually observed on a leneta chart after fully dry by an observer from a distance of approximatively 50 cm and a viewing angle of 45°.

Rating Visual Observation 1 the film is covering the cardboard perfectly without visible defects 2 the film can be altered by haze, local opacity or whitening but no pinholes are visible 3 pinholes of an average size below 1 mm diameter can be observed randomly 4 pinholes and carters of a diameter not exceeding 3 mm can be observed randomly 5 Craters of a diameter exceeding 3 mm can be observed on the film randomly Gloss Measurement Matting test: The gloss measurement is the measurement of the reflection from an incident light source. The measure is reported using a glossmeter in Gloss Unit (GU). The defined standard is the amount of reflected light from a black glass standard and is equal as 100 GU. The gloss of each Sample was measured using a gloss meter from Elcometer (Elcometer 408—triple angle gloss meter). The gloss is an indication of the disruption of the film brought by additives and is better when the GU is higher in the case that no matting additives are included in the coating formulation.

Anti-soiling test: This test methodology is in accordance with VDA-230-212 (test copy available from www.V-DA.de—Verband Der Automobilindustrie). This test uses soiled cloths (EMPA 128) obtained from EMPA (Swiss Federal Laboratories for Materials Testing and Research). EMPA 128 is a jeans fabric colored with indigo & sulphur black soiled with olive oil & carbon black. In this test a section of white leather is coated with a Sample aqueous coating composition. The coated Sample is then attached to the fixed part of a Martindale Abrasion and oiling tester (M235). This equipment is available from SDL Atlas. The soiling fabric (EMPA 128) is attached to the mobile part of the abrader and a weight of 12 or 9 KPa is added. Each Sample is then evaluated after 1000 cycles (Lissajous curve). The L*a*b* values (3 axis of light) of each Sample is then measured using a spectrophotometer before soiling and immediately after the soiling cycle. The coated Samples of soiled leather are stored for 24 hours at room temperature and then cleaned with a wet cheesecloth (rub 50 times in one direction and then 50 times in the opposite direction). After this cleaning step, the Samples are stored for 1 hour to dry at room temperature and the L*a*b* values are re-measured and used to calculate color differences expressed as ΔE.

Stick-Slip test: This test provides a proxy for the potential noise generated when two identical coated Samples are rubbed against each other. This test method utilizes standardized equipment (SSP-04 from Ziegler Zins using the VDA 230-206 standard). The test generates a risk priority number (RPN) which is a reliable indicator of whether a coating will generate creaking or squeaking noises. The RPN is graduated from 1 to 10 with 1 being the lowest risk to generate noise (i.e. the most desired result). The same set of coated Samples is exposed to 4 different test conditions as defined in the standard. The pressure at which the 2 Samples are maintained is expressed in newton and ranges from 10 to 40, and the speed at which the 2 Samples are moving relative to each other. This is expressed in mm-sec.

The composition of each tested Sample is set forth in Table 1. The results of the testing are provided in Tables 2-4.

TABLE 1

| Sample | Description |
|---|---|
| A | 20 g of PUD1 with 1 g of Emulsion A (siloxane-based polyamide) |
| B | 20 g of PUD1 with 1.73 g of Emulsion B (Nylon 11-EEA) |
| C | 20 g of PUD1 with 1 g of Emulsion A |
| D | 20 g of PUD1 with 0.91 g of Emulsion C (silicone wax) |
| E | 16 g of PUD2, 4 g of XL1 with 1 g of Emulsion A |
| F | 16 g of PUD2, 4 g of XL1 with 0.91 g of Emulsion C |
| G | 20 g of PUD1 with 2 g of Emulsion A |
| H | 20 g of PUD1 with 2 g of Emulsion D (high mw polyorganosiloxane) |
| I | 20 g of PUD1 with 2 g of Emulsion E (silicone resin) |
| Control | 20 g of PUD1 |

TABLE 2

| | Compatibility test (scale 1-5) | Matting test: (0-100) (Avg of 3 measurements) | | |
|---|---|---|---|---|
| Sample | Leneta/film | 20° angle | 60° angle | 85° angle |
| A | 1-No defect | 60.2 | 82 | 96.2 |
| B | 2-a few pin holes | 49.5 | 76.7 | 90.4 |
| C | 1 no defects | 52 | 82 | 95 |
| D | 3 small craters | 40 | 63 | 74 |
| E | 2 a few pin holes | 60 | 86 | 95 |
| F | 2 a few small craters | 19 | 51 | 70 |

TABLE 3

| Sample | Anti-soiling Testing: ΔE values measured 24 H RT after soiling | Anti-soiling Testing: ΔE values measured 24 HR RT after cleaning |
|---|---|---|
| A | 4.8 | 1.6 |
| B | 23.9 | 8 |
| C | 2.7 | 1.4 |
| D | 6.5 | 1.7 |
| E | 4.3 | 1.7 |
| F | 10.5 | 4.4 |
| G | 3.9 | 1 |
| H | 4.6 | 1.8 |
| I | 5.7 | 2.1 |
| Control | 24 | 3.6 |

TABLE 4

Stick-Slip test:

| Sample | Test (N/mm-sec) | Risk Priority No. (1-10) |
|---|---|---|
| A | 10/1 | 1 |
|  | 10/4 | 1 |
|  | 40/1 | 1 |
|  | 40/4 | 1 |
| B | 10/1 | 9 |
|  | 10/4 | 8 |
|  | 40/1 | *maximum measurable value of instrument. |
|  | 40/4 | *maximum measurable value of instrument. |
| C | 10/1 | 1 |
|  | 10/4 | 1 |
|  | 40/1 | 1 |
|  | 40/4 | 1 |

TABLE 4-continued

Stick-Slip test:

| Sample | Test (N/mm-sec) | Risk Priority No. (1-10) |
|---|---|---|
| D | 10/1 | 9 |
|  | 10/4 | 8 |
|  | 40/1 | 9 |
|  | 40/4 | *maximum measurable value of instrument. |
| E | 10/1 | 1 |
|  | 10/4 | 1 |
|  | 40/1 | 1 |
|  | 40/4 | 1 |
| F | 10/1 | 4 |
|  | 10/4 | 2 |
|  | 40/1 | *maximum measurable value of instrument. |
|  | 40/4 | *maximum measurable value of instrument. |

The invention claimed is:

1. An aqueous coating composition comprising: from 20 to 60 wt % of an aqueous dispersion of polyurethane, and from 0.5 to 10 wt % of a siloxane-based polyamide comprising a block copolymer comprising siloxane and amide blocks.

2. The aqueous coating composition of claim 1, wherein the siloxane-based polyamide has the following physical properties:
   i) weight average molecular weight (Mw) of: 50,000 to 200,000 Daltons;
   ii) melting point range of 70 to 120° C.;
   iii) melt viscosity of 5000 to 10,000 cps at 140° C.; and
   iv) particle size of 0.1 to 15 micron.

3. The aqueous coating composition of claim 1, wherein the siloxane amide block copolymer is represented by Formula A:

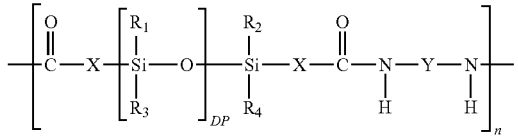

wherein:
   (1) DP is 1-700; (2) n is a 1-500; (3) X is a divalent, aliphatic hydrocarbon group having 1-30 carbons;
   (4) Y is:
   (a) a divalent hydrocarbon group having 1-40 carbons, wherein the hydrocarbon group may optionally and additionally be substituted by at least one member selected from the group consisting of (i) hydroxy; (ii) a C3-C8 cycloalkyl; (iii) 1-3 members selected independently from the group consisting of C1-C3 alkyls and phenyl optionally substituted by 1-3 members selected independently from the group consisting of C1-C3 alkyls; (iv) a C1-C3 hydroxy alkyl; and (v) a C1-C6 alkyl amino, and the hydrocarbon group may optionally and additionally contain at least one of (i) 1-3 amide linkages; (ii) a C5 or C6 cyclic, divalent, saturated hydrocarbon group; and (iii) a phenylene optionally substituted by 1-3 members selected independently from the group consisting of C1-C3 alkyls, or (b) $R^{20}T(R^{21})R^{22}$, where $R^{20}$ and $R^{22}$ are divalent C1-C10 hydrocarbon groups and $R^{21}$ is a monovalent or divalent C1-C10 hydrocarbon group, such groups being independent of one another, and T is C(R), where is selected from hydrogen, R', $R^2$, $R^3$, $R^4$, or a trivalent N, P or Al; and (5) Each of $R^1$, $R^2$, $R^3$ and $R^4$ is independently selected from the group consisting of methyl, ethyl, propyl, isopropyl, a siloxane chain, and phenyl, wherein the phenyl may optionally be substituted at 1-3 positions by substituents independently selected from the group consisting of methyl and ethyl.

4. The aqueous coating composition of claim 3 wherein DP is 50 to 200 and n is 2 to 50.

5. The aqueous coating composition of claim 3 where $R_1$, $R_2$, $R_3$ and $R_4$ are all methyl; and X and Y are independently selected from a C4-C18 aliphatic hydrocarbon group.

6. The aqueous coating composition of claim 1 wherein the polyurethane has a Mw of: 150,000 to 1,500,000 Daltons.

* * * * *